United States Patent Office 2,707,198
Patented Apr. 26, 1955

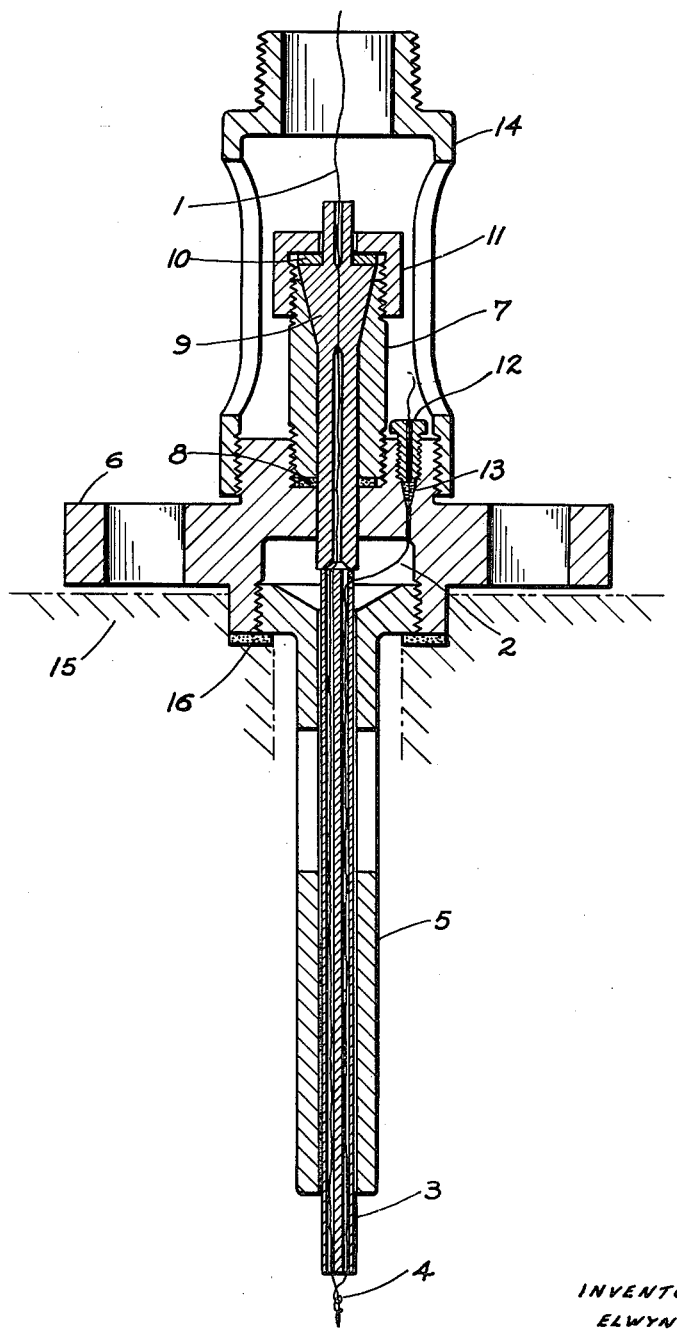

2,707,198

THERMOCOUPLE

Elwyn D. Jones, McMasterville, Quebec, Canada, assignor, by mesne assignments, of one-half to Du Pont Company of Canada Limited, Montreal, Quebec, Canada, a corporation of Canada, and one-half to Canadian Industries (1954) Limited, Montreal, Quebec, Canada, a corporation of Canada Application January 4, 1954, Serial No. 401,783

Claims priority, application Canada October 28, 1953

2 Claims. (Cl. 136—4)

This invention relates to thermocouples, more particularly it relates to thermocouple units comprising a dissimilar metal junction and a supporting means for said junction where the unit is to be used under extreme conditions of high temperature and pressure.

Common thermocouple assemblies include thermocouple wells which extend into the reaction zone within the vessel concerned. These wells are tubular metal pieces closed off at one end and serve to house the metal junction and associated parts. A certain amount of reduced sensitivity is inherent in such a system and this reduced sensitivity to temperature change introduces a lag in the operation of automatic control equipment dependent upon the thermocouple.

Another type of thermocouple unit consists of a platinum/rhodium alloy thimble to the inside of the tip of which is welded a platinum wire. This thimble is in turn welded to the end of a short stainless steel tube which is inserted through the wall of the reactor and serves to support the unit. Under high pressure conditions in the reactor erosion occurs in the area of the weld between thimble and tube. Pinholes form as a result of this and allow reaction gases to enter the tube and contamination of the electrical insulation inside the tube may occur which may result in serious misreading on control apparatus.

The foregoing objections may be overcome by constructing a thermocouple unit consisting of two wires, one platinum, the other platinum/rhodium twisted and welded together, the junction being exposed to the reaction area. These wires are supported in position by a porcelain insulator consisting of a rod drilled with two adjacent holes through which they run. The wires pass out of the unit through a polytetrafluoroethylene gasket which provides a gas-tight inert seal.

It is an object of this invention to provide as a unit a thermocouple which will withstand long periods of operation at high temperatures and pressures in a corrosive gas stream. It is a further object of this invention to provide an easily constructed thermocouple unit which will accurately read high temperatures under extreme conditions of operation with little danger of breakdown due to leakage and contamination of electrical insulation and which may be easily dismantled for cleaning or replacement. Other objects will become apparent from the description, claims and accompanying drawing.

According to one form of the present invention, a platinum wire twisted with and welded to the end of a platinum/rhodium wire forms the dissimilar metal junction which measures the temperature of the surrounding atmosphere. These thermocouple units are commonly inserted within some type of gas-tight enclosure and are thus held in the reaction stream or vessel as the operation calls for. The thermocouple junction according to the present invention is itself inserted within the reaction chamber. The support for the unit comprises a combination of a cylindrical porcelain insulator provided with a twin bore to accommodate the two wires which is in turn supported by a stainless steel tube, the whole being supported by a steel unit suitably flanged and threaded to carry the stainless steel tube and provide gas-tight inert seals to allow the exit of the wires from the interior of the reaction chamber. The seals provided are preferably of some inert plastic material such as polytetrafluoroethylene. The platinum/rhodium wire is passed through the body of the supporting flange and is sealed with a polytetrafluoroethylene bead under a small screw. This side of the thermocouple is at ground potential. The platinum wire is passed through the centre of a polytetrafluoroethylene sleeve formed into a cone in order to provide a gas-tight seal. The polytetrafluoroethylene is extended on either side of the seal to provide good insulation of the platinum wire and provide maximum leakage path over its surface.

Inside the reactor a loose joint exists between the end of the polytetrafluoroethylene sleeve and the twin bore porcelain insulator. This joint is preferably located at a point well away from the grounded parts of the flange assembly so that the possibility of surface electrical leakage to ground by condensate products is kept to a minimum.

Under severe conditions of operation the steel tube used to support the porcelain insulator may be subject to heavy erosion. Corrosion and flaking of the inside wall make it difficult to remove for inspection. This difficulty is overcome by providing three slots in the tube wall which permit effective escape of such decay products.

The operation of my thermocouple may be further illustrated by reference to the drawing, a lateral cutaway representation of one form of my invention.

In the drawing, 1 is the platinum wire and 2 the platinum/rhodium wire shown running through the twin bore porcelain insulator 3 and coming together at the juncture 4 where they are twisted and welded together. 5 is the Nichrome steel tube which loosely supports the insulator 3.

6 is the flange unit which is bolted firmly to the reactor wall 15 and is sealed by the polytetrafluoroethylene washer 16. The Nichrome steel tube 5 is threaded into the bottom of the flange. 7 is a tubular steel support threaded to the top of the flange and sealed to it by means of a polytetrafluoroethylene washer 8. The support 7 carries the polytetrafluoroethylene sleeve 9 through which the platinum wire runs. 10 is a steel washer and 11 is a threaded cap which when tightened on the polytetrafluoroethylene sleeve causes a perfect gas tight seal between the wire and the sleeve and the sleeve and the tubular support.

12 is the small screw which tightens onto the polytetrafluoroethylene button 13. The platinum/rhodium wire 2 runs through both the screw and the button and the seal is effected through the pressure exerted by the screw.

14 is a standard pipe fitting serving merely to support a thermocouple junction box which may be screwed onto the top threads of the fitting. The fitting may be slotted to enable the operator to check the condition of the polytetrafluoroethylene seals.

An experimental thermocouple was constructed as described and put into service in the reactor of an ammonia oxidation unit. Operating conditions in the reactor involve a temperature slightly greater than 900° C. and pressures in the region of 120 p. s. i. Thermocouples of the well type or thimble type did not stand up under these conditions. The well type does not possess the necessary sensitivity to temperature change in the reactor and consequently is incapable of exercising proper control of ammonia flow in the oxidation unit to compensate for temperature variation. The thimble type especially produced a problem involving pinhole leaks in the platinum to stainless steel weld. Gas escaping into the interior of this type of assembly caused contamination of the insulation and a consequent downscale drift on the recording instrument. This caused the flow of ammonia in the oxidation unit to be increased with consequent raising of the catalyst temperature and the creation of a dangerous situation. The life of the thimble type of thermocouple unit was found to be about three weeks before pinholes started to develop. The thermocouple made according to the invention was tested during ten months of identical operation and no difficulties arose during this time.

It will be apparent that the foregoing description permits of modifications without departing from the spirit or scope thereof. I intend therefore to be limited only in accordance with the following claims.

Having thus described my invention what I claim is:

1. A thermocouple unit comprising in combination a pair of dissimilar metallic wires twisted and welded together to form a junction, said junction exhibiting thermoelectric properties, the ends of said wires being supported by thermal-resistive electrical-resistive means in turn being supported by a corrosion-resistive steel metallic tube attached to a supporting flange, means for allowing gas tight passage of the ground potential wire through a hole in said flange consisting of a bead of inert plastic material and a screw both provided with a centre hole, said wire running through said holes, means for allowing gas-tight passage of the remaining wire consisting of a sleeve of inert plastic material of partial conical shape and provided with a centre hole and means for supporting and compressing said sleeve consisting of a tube supported by the said flange and provided with a screw cap having a centre hole, said remaining wire passing through said plastic sleeve and held firmly by the pressure exerted by said screw cap upon said sleeve.

2. A thermocouple unit comprising in combination a pair of dissimilar metallic wires twisted and welded together to form a junction, said junction exhibiting thermoelectric properties, the ends of said wires being supported by thermal-resistive electrical-resistive means in turn being supported by a corrosion-resistive steel metallic tube attached to a supporting flange, means for allowing gas tight passage of the ground potential wire through a hole in said flange consisting of a bead of polytetrafluoroethylene and a screw both provided with a centre hole, said wire running through said holes, means for allowing gas tight passage of the remaining wire consisting of a sleeve of polytetrafluoroethylene of partial conical shape and provided with a centre hole and means for supporting and compressing said sleeve consisting of a tube supported by the said flange and provided with a screw cap having a centre hole, said remaining wire passing through said polytetrafluoroethylene sleeve and held firmly by the pressure exerted by said screw cap upon said sleeve.

References Cited in the file of this patent

UNITED STATES PATENTS

| | | |
|---|---|---|
| 1,422,672 | Coglan | July 11, 1922 |
| 2,218,622 | Rabezzana | Oct. 22, 1940 |

OTHER REFERENCES

Du Pont trade publication entitled "Teflon," received U. S. Patent Office, Jan. 15, 1951.